Feb. 19, 1924.
G. A. NOETZEL
SHOCK ABSORBER
Filed July 18, 1921   2 Sheets-Sheet 1

INVENTOR:
Gustav A. Noetzel

ATTORNEYS.

Feb. 19, 1924.
G. A. NOETZEL
1,484,338
SHOCK ABSORBER
Filed July 18, 1921    2 Sheets-Sheet 2
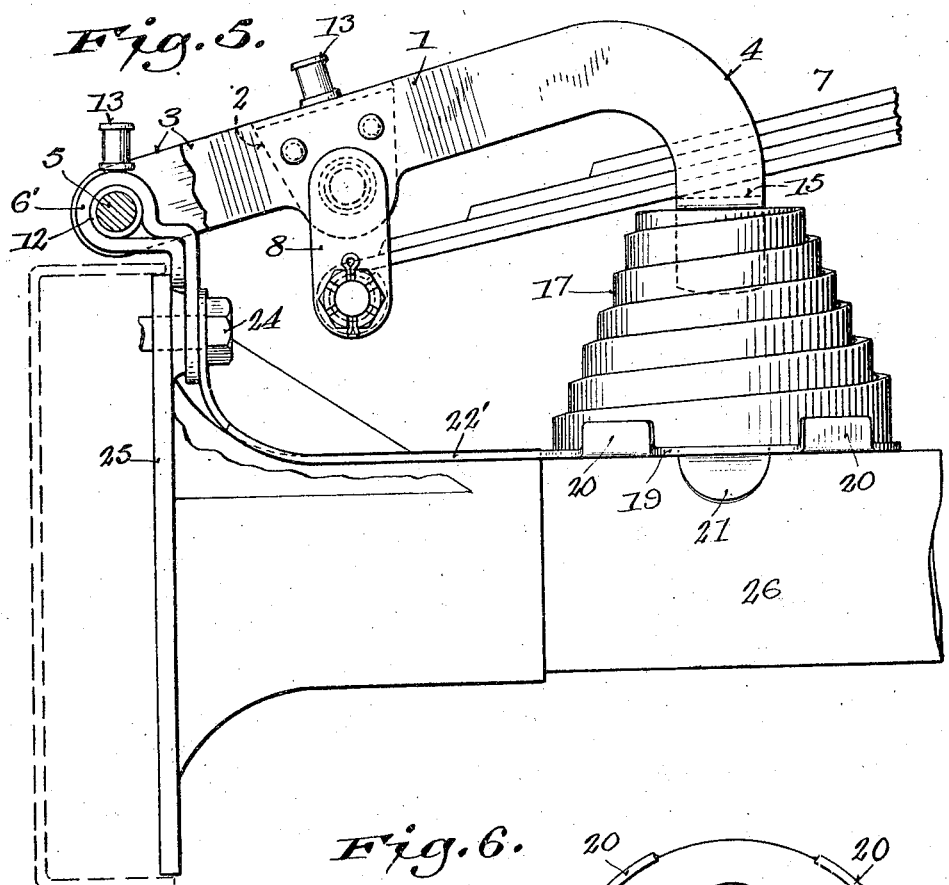
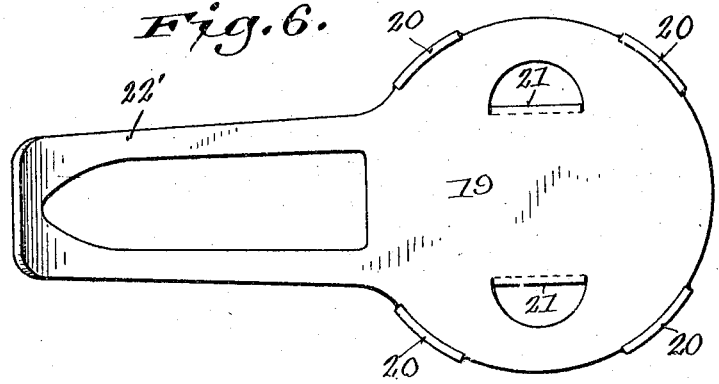
INVENTOR:
Gustav A. Noetzel
BY
ATTORNEYS.

Patented Feb. 19, 1924.

1,484,338

UNITED STATES PATENT OFFICE.

GUSTAV A. NOETZEL, OF WAUKESHA, WISCONSIN, ASSIGNOR TO PRESSED METAL MFG. CO., OF WAUKESHA, WISCONSIN, A CORPORATION OF WISCONSIN.

SHOCK ABSORBER.

Application filed July 18, 1921. Serial No. 485,417.

*To all whom it may concern:*

Be it known that I, GUSTAV A. NOETZEL, a citizen of the United States, residing at Waukesha, in the county of Waukesha and State of Wisconsin, have invented certain new and useful Improvements in Shock Absorbers, of which the following is a specification, reference being had to the accompanying drawing, forming a part thereof This invention relates more particularly to shock absorbers for cars of the Ford type having transverse leaf springs over the axles or leaf springs and spring supporting members approximately parallel therewith.

Its main objects are to ease the action of and check or reduce the recoil of the springs, thereby causing the body of the vehicle to ride more easily and smoothly; to facilitate the application of the device to a car; and generally to simplify and improve the construction and operation of shock absorbers of this kind.

It consists in the construction, arrangement and combination of parts as hereinafter particularly described and pointed out in the claims.

In the accompanying drawing like characters designate the same parts in the several figures.

Figure 1:
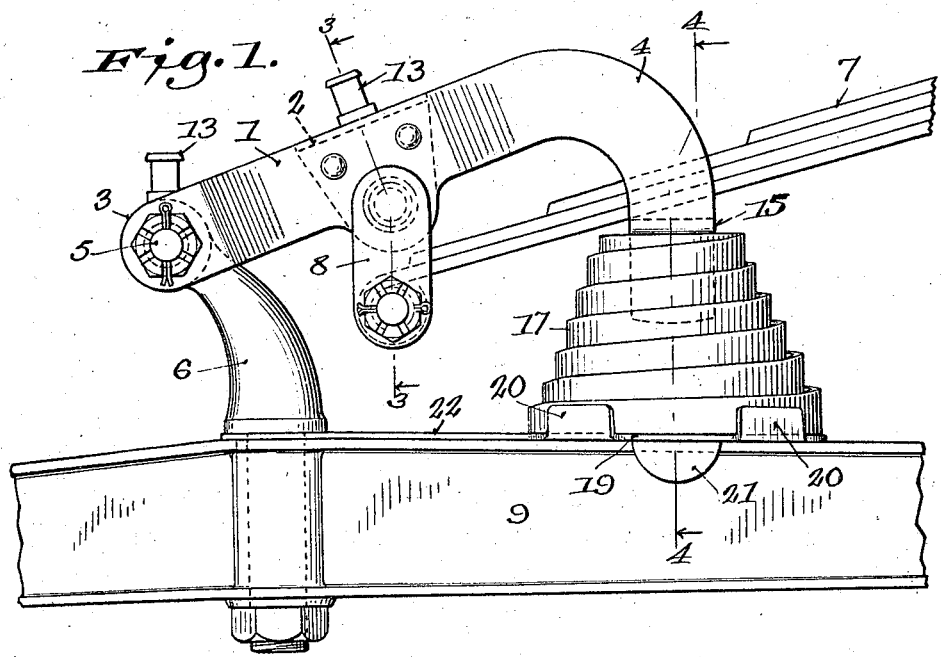
Figure 2:
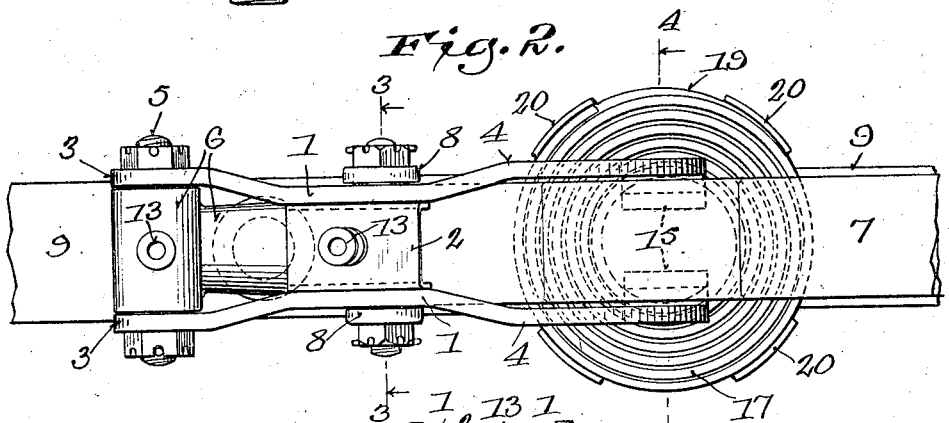
Figure 3:
Figure 4:
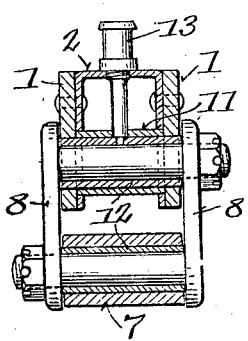
Figure 4:
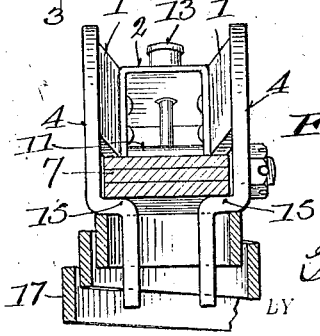

Figure 1 is a side elevation of a shock absorber embodying the invention as applied to the front axle and spring of a Ford car; Fig. 2 is a plan view of the same; Fig. 3 is a cross section on the line 3—3, Figs. 1 and 2; Fig. 4 is a similar section on the line 4—4, Figs. 1 and 2; Fig. 5 is a side elevation similar to Fig. 1, of the shock absorber as applied to the rear axle or axle housing and spring of a Ford car; and Fig. 6 is a plan view of the rear volute-spring seat forming a part of the device shown in Fig. 5.

Referring to Figs. 1 to 4 inclusive, the device comprises a forked angular or elbow-shaped lever, preferably constructed of two similar metal plates or bands 1, the middle portions of which are bent towards each other and are riveted or fastened to an inverted U-shaped connecting and spacing member 2. The plates or bands 1 form fork arms 3 and 4 at the ends of the lever. The arms 3 are pivotally connected by a bolt or pin 5 with the upper end of a spring perch 6, such as are used in Ford cars for suspending the front spring 7 with shackles 8 over the front axle 9, the perch 6, which is reversed or turned outwardly from its usual position, serving as a fulcrum member for the lever, and the axle 9 as a supporting member for the shock absorber spring as well as for the leaf spring of the car.

The connecting and spacing member 2, is provided as shown in Fig. 3, with a transverse sleeve 11, the bore of which registers at the ends with holes in the lever plates or bands 1, to form a bearing for the upper pin or bolt of the shackle 8, which is provided with a bushing 12. The lever is preferably provided with an oil or grease cup 13, the neck of which is threaded in the member 2, extends through said member into an opening in the sleeve 11, and communicates with an oil hole in the bushing 12.

The fork arms 4 at the inner end of the lever are curved or bent downwardly towards the axle 9, to straddle the spring 7, which passes freely between them, and are offset towards each other, the offsets 15 bearing against the under side of the spring, as shown in Fig. 4 or forming bearings below the leaf spring.

A coil-spring 17, preferably made in volute form of a flat steel band, is interposed between the axle or spring supporting member 9 and the inner end of the lever below the spring 7, with the upper smaller end of the volute-spring in engagement with the under side of the offsets 15, as shown in Fig. 4. The lower and larger end of the spring 17 rests upon and is held in place by a plate or seat 19, which is formed with upwardly projecting flanges or lugs 20, embracing the bottom coil of the spring, and with downwardly projecting flanges or lugs 21, embracing the axle or spring supporting member 9, as shown in Fig. 1.

The seat plate 19 is formed or provided with an outwardly projecting arm 22, resting on the top of the axle or spring supporting member 9, and bolted or fastened thereto with the spring perch or fulcrum member 6.

In the formation of the volute spring 17, the band of which the spring is made, is coiled flatwise around and perpendicular to the axis of the spring, so that the smaller convolutions will telescope into the larger convolutions, and in the application of the device to a car, the body will not be elevated above its original normal position.

The fork arms 4 are extended downward beyond their offsets 15, as shown in Fig. 4, into the smaller upper end of the volute spring 17, thereby cooperating with the spring seat 19 to confine the spring in its proper working position.

Referring to Figs. 5 and 6, the device is constructed and arranged in substantially the same way for application to the rear spring or springs and axle or axle housing of a Ford car, as for the front spring and axle. The only difference in the device in this case, is in the construction of the bracket or fulcrum member 6' and the arm 22' of the spring seat 19. The bracket or fulcrum member 6', which may be made of band metal, as shown in Fig. 5, to take the place of the usual rear spring shackle bracket, is fastened with the upwardly bent end of the arm 22' by a bolt 24 to the inner wall 25 of the brake housing, which forms a part of or is rigidly attached to the rear axle housing 26. The arm 22' is cut away along the center, as shown in Fig. 6, to fit over the top of the cylindrical hub of the housing wall 25 or the enlargement of the axle housing 26 adjacent the end thereof, and thus permit the spring seat 19 to bear, as shown in Fig. 5, on the top of the reduced inner portion of the axle housing.

The lower shackle bolts or pins and the pivot bolts or pins 5 on which the levers 1 are fulcrumed, like the upper shackle bolts or pins, as shown in Fig. 3, are preferably provided with bushings 12, and the spring perch 6 and the bracket 6' or the fulcrum members, are provided with oil or grease cups 13.

In the operation of the device, the volute springs 17 yield with little if any flexure of the leaf spring 7 when the vehicle wheels pass over small obstructions, thus relieving the body of the vehicle of minor shocks, jars or vibration, but when the wheels pass over larger obstructions or rough roads, the leaf springs will be flexed with the compression of the volute springs, which will cooperate with and ease or soften the action of the leaf springs, the recoil of the volute springs being checked by their engagement with the offsets 15 of the lever arms 4 and the engagement of the offsets with the leaf springs 7, thereby tending to check or ease the recoil of the leaf springs.

Various changes in the minor details of construction and arrangement of parts of the device may be made without departure from the principle and scope of the invention as defined in the following claims.

I claim:

1. In a shock absorber the combination of a forked lever having a fulcrum connection at one end and its fork arms at the other end offset to form bearings for engagement with the under side of a leaf spring straddled by said arms and connected with the lever between its ends, and a volute spring adapted to engage at its upper end the under sides of the offsets of the fork arms and to rest at its lower end on a supporting member below the leaf spring.

2. In a shock absorber the combination of a forked lever having a fulcrum connection at one end and its fork arms at the other end offset to form bearings for engagement with the under side of a leaf spring straddled by said arms and connected at the end with the lever between its ends, and a volute spring adapted to engage at its upper and smaller end the under sides of the offsets of the fork arms and to rest at its lower end on a supporting member below the leaf spring, the fork arms being extended downwardly beyond the offsets into the smaller end of the volute spring.

3. In a shock absorber the combination with a leaf spring and a spring supporting member, of a forked elbow lever having a fulcrum connection at one end with said supporting member and a shackle connection between its ends with an end of the spring, the other end of the lever being directed towards said supporting member with the fork arms straddling the spring and offset towards each other between the spring and the supporting member, and a coil spring interposed between the supporting member and lever and engaging at one end the offsets of the fork arms of the lever, said fork arms being extended towards the supporting member into the coil spring.

4. In a shock absorber the combination with a leaf spring and a spring supporting member, of an elbow lever forked at the ends and having a shackle connection between its ends with an end of the spring, a fulcrum member fixed to said supporting member and embraced by and pivoted to the fork arms at one end of the lever, the fork arms adjacent the other end of the lever straddling the spring and being offset towards each other between the spring and the supporting member, and a spring interposed between said supporting member and the offsets of the fork arms on the sides thereof opposite the leaf spring.

5. In a shock absorber the combination of a forked elbow lever provided at one end with a fulcrum bearing for mounting on a spring supporting member and between its ends with a spring-shackle bearing, the fork arms at the other end of the lever being offset towards each other below a leaf spring passing freely between them and connected at its end with the lever by a shackle, and a coil spring adapted to be mounted at one end on the spring supporting member and to engage at its opposite end with the fork arm offsets of the lever opposite the leaf spring.

6. In a shock absorber the combination of a forked elbow lever formed for pivotal connection at one end with a fulcrum member and between its ends with a spring-shackle, the fork arms at the other end of the lever being offset towards each other below a leaf spring passing freely between them and connected at its end with the shackle, a spring seat adapted to be mounted on a spring supporting member and having an arm adapted to be fastened with said fulcrum member to said spring supporting member, and a coil spring interposed between said seat and lever in engagement with the fork arm offsets of the lever on the sides thereof opposite the leaf spring.

In witness whereof I hereto affix my signature.

GUSTAV A. NOETZEL.